(12) United States Patent
Garg et al.

(10) Patent No.: US 6,453,346 B1
(45) Date of Patent: Sep. 17, 2002

(54) METHOD AND APPARATUS FOR INTELLIGENT STORAGE AND REDUCTION OF NETWORK INFORMATION

(75) Inventors: Atul R. Garg, Saratoga; Daniel G. Ketcham, Cupertino; Minh Anh Do, San Jose, all of CA (US)

(73) Assignee: ProactiveNet, Inc., Santa Clara, CA (US)

(*) Notice: Subject to any disclaimer, the term of this patent is extended or adjusted under 35 U.S.C. 154(b) by 0 days.

(21) Appl. No.: 09/118,704

(22) Filed: Jul. 17, 1998

(51) Int. Cl.$^7$ .................................... G06F 15/173
(52) U.S. Cl. ....................... 709/224; 709/223
(58) Field of Search ................. 709/224, 223; 370/245, 254; 714/47

(56) References Cited

U.S. PATENT DOCUMENTS

| | | | | |
|---|---|---|---|---|
| 5,251,152 A | * | 10/1993 | Notess | 709/224 |
| 5,347,269 A | * | 9/1994 | Vanden Heuvel et al. | 340/825.44 |
| 5,384,565 A | * | 1/1995 | Cannon | 340/825.44 |
| 5,446,874 A | * | 8/1995 | Waclawsky et al. | 714/1 |
| 5,634,008 A | * | 5/1997 | Gaffaney et al. | 709/224 |
| 5,634,009 A | * | 6/1997 | Iddon et al. | 709/223 |
| 5,675,727 A | * | 10/1997 | Watanabe | 714/20 |
| 5,699,403 A | * | 12/1997 | Ronnen | 379/32 |
| 5,796,633 A | * | 8/1998 | Burgess et al. | 702/187 |
| 5,831,428 A | * | 11/1998 | Pyle et al. | 324/142 |
| 5,850,386 A | * | 12/1998 | Anderson et al. | 370/241 |
| 5,944,782 A | * | 8/1999 | Noble et al. | 709/202 |
| 5,963,943 A | * | 10/1999 | Cummins et al. | 707/10 |
| 5,991,758 A | * | 11/1999 | Ellard | 707/6 |
| 6,081,692 A | * | 6/2000 | Hayato | 455/31.2 |
| 6,122,664 A | * | 9/2000 | Boukobza et al. | 709/224 |
| 6,182,157 B1 | * | 1/2001 | Schlener et al. | 709/318 |
| 6,275,783 B1 | * | 8/2001 | Okamura | 702/187 |
| 6,327,620 B1 | * | 12/2001 | Tams et al. | 709/224 |
| 6,327,677 B1 | * | 12/2001 | Garg et al. | 709/224 |
| 6,381,306 B1 | * | 4/2002 | Lawson et al. | 379/112.01 |

* cited by examiner

Primary Examiner—Zarni Maung
Assistant Examiner—Andrew Caldwell
(74) Attorney, Agent, or Firm—Blakely, Sokoloff, Taylor & Zafman LLP

(57) ABSTRACT

A method and apparatus for intelligent storage and reduction of network information reduces an amount of storage space required for network information by receiving current network information and comparing the current network information with previously received network information. The current network information is saved if the current network information exceeds the previously, received network information by a threshold, and an identifier associated with the current network information is updated if the current network information does not exceed the previously received network information by the threshold.

25 Claims, 12 Drawing Sheets

Base Table 60

| Device | Data(1) | ••• | Data(x) | Timestamp |
|--------|---------|-----|---------|-----------|
| 1 | | | | |
| 2 | | | | |
| ⋮ | | | | |
| n | | | | |

FIG. 5

Log Table 68

| Device | Data(1) | ••• | Data(x) | Start Time | End Time |
|--------|---------|-----|---------|------------|----------|
| 1 | | | | | |
| 1 | | | | | |
| 1 | | | | | |
| 1 | | | | | |
| 2 | | | | | |
| 2 | | | | | |
| ⋮ | | | | | |
| n | | | | | |
| n | | | | | |
| n | | | | | |

FIG. 6

Rate Table 78

| Device | Data(1) Min | Data(1) Avg | Data(1) Max | ••• | Data(x) Min | Data(x) Avg | Data(x) Max | Start Time | End Time |
|--------|-------------|-------------|-------------|-----|-------------|-------------|-------------|------------|----------|
| 1 | | | | | | | | | |
| 2 | | | | | | | | | |
| ⋮ | | | | | | | | | |
| n | | | | | | | | | |

FIG. 7

Rate Log 88

| Device | Data (1) Min | Data (1) Avg | Data (1) Max | · · · | Data (x) Min | Data (x) Avg | Data (x) Max | Start Time | End Time |
|---|---|---|---|---|---|---|---|---|---|
| 1 | | | | | | | | | |
| 1 | | | | | | | | | |
| 1 | | | | | | | | | |
| 1 | | | | | | | | | |
| 2 | | | | | | | | | |
| 2 | | | | | | | | | |
| ⋮ | | | | | | | | | |
| n | | | | | | | | | |
| n | | | | | | | | | |
| n | | | | | | | | | |

FIG. 8

Signature Table 106

| Device | Data (1) Min | Data (1) Avg | Data (1) Max | · · · | Data (x) Min | Data (x) Avg | Data (x) Max | Start Time | End Time |
|---|---|---|---|---|---|---|---|---|---|
| 1 | | | | | | | | Sun 0:00 | Sun 1:00 |
| 1 | | | | | | | | Sun 1:00 | Sun 2:00 |
| 1 | | | | | | | | Sun 2:00 | Sun 3:00 |
| ⋮ | | | | | | | | ⋮ | ⋮ |
| 1 | | | | | | | | Sat 22:00 | Sat 23:00 |
| 1 | | | | | | | | Sat 23:00 | Sun 0:00 |
| ⋮ | | | | | | | | | |
| n | | | | | | | | | |
| n | | | | | | | | | |
| n | | | | | | | | | |

FIG. 10

Change Log 116

| Attribute | Type | Amount | Start Time | End Time |
|---|---|---|---|---|
| Device (1) | | | | |
| Device (1) | | | | |
| ⋮ | | | | |
| Device (n) | | | | |

118 → Attribute; 120 → Type; 122 → Amount; 124 → {Start Time, End Time}

FIG. 11

Base Configuration Table 150

| Device | Data(1) | • • • | Data(x) | Timestamp |
|---|---|---|---|---|
| 1 | | | | |
| 2 | | | | |
| ⋮ | | | | |
| n | | | | |

152 → Device; 154 → {Data(1) ... Data(x)}; 156 → Timestamp

FIG. 15

Configuration Log 158

| Device | Data(1) | • • • | Data(x) | Timestamp |
|---|---|---|---|---|
| 1 | | | | |
| 2 | | | | |
| ⋮ | | | | |
| n | | | | |

160 → Device; 162 → {Data(1) ... Data(x)}; 164 → Timestamp

FIG. 16

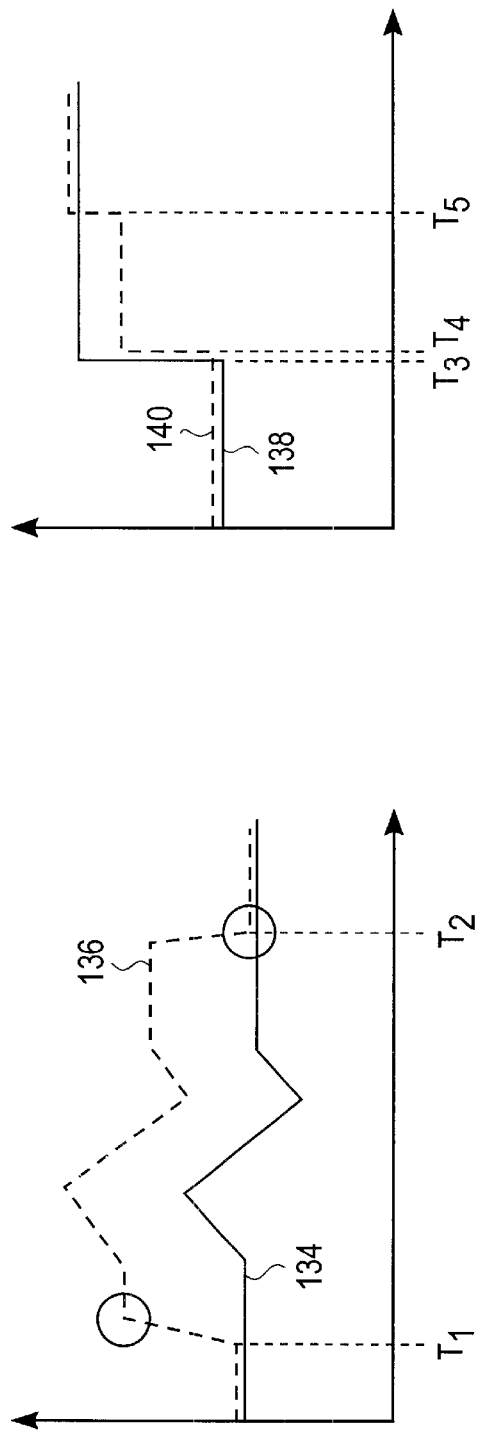
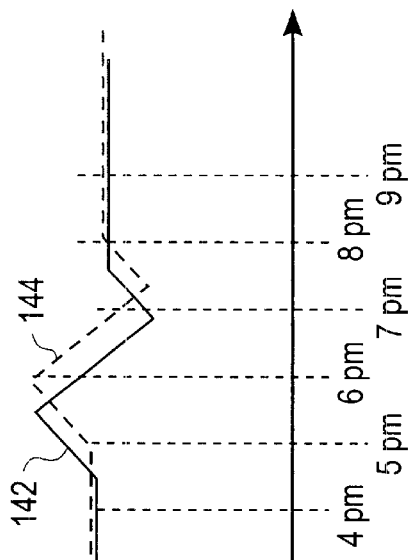
FIG. 13a
FIG. 13b
FIG. 13c

METHOD AND APPARATUS FOR INTELLIGENT STORAGE AND REDUCTION OF NETWORK INFORMATION

FIELD OF THE INVENTION

The present invention relates to network monitoring systems. More specifically, the present invention relates to intelligently reducing and storing network information.

BACKGROUND

Networks are used to interconnect multiple devices, such as computing devices, and allow the communication of information between the various interconnected devices. Many organizations rely on networks to communicate information between different individuals, departments, work groups, and geographic locations. In many organizations, a network is an important resource that must operate efficiently. For example, networks are used to communicate electronic mail (e-mail), share information between individuals, and provide access to shared resources, such as printers, servers, and databases.

A typical network contains multiple interconnected devices, including computers, servers, printers, and various other network communication devices such as routers, bridges, switches, and hubs. The multiple devices in a network are interconnected with multiple communication links that allow the various network devices to communicate with one another.

Network management is the process of managing the various network devices and network communication links to provide the necessary network services to the users of the network. Typical network management systems collect information regarding the operation and performance of the network and analyze the collected information to detect problems in the network. The amount of data collected in such a manner can be vast and increases as the size of the network (e.g., the number of interconnected devices in the network) increases and as the collection frequency increases. For example, tracking information for a network having 1000 interconnected devices can easily result in over 100 Mbytes of data daily. Although it would be beneficial to have access to such information over time, typical network management systems do not allow for the ability to store such large amounts of data. Furthermore, for many networks the storage capacity required to store such large amounts of data is prohibitively expensive.

Additionally, it is often useful for network management systems to be able to identify the topology of the network to a user(s). However, typical network management systems provide only a current "snapshot" of the network topology and do not provide the ability to view previous topologies of the network. Furthermore, any attempts to store such data would simply exacerbate the storage space problem discussed above.

It is therefore desirable to provide improved data storage of information regarding the operation and performance of a network.

SUMMARY OF THE INVENTION

Embodiments of the present invention provide a method and apparatus for intelligent storage and reduction of network information. An embodiment of the present invention is capable of reducing an amount of storage space required for network information by receiving current network information and comparing the current network information with previously received network information. The current network information is saved if the current network information exceeds the previously received network information by a threshold, and an identifier associated with the current network information is updated if the current network information does not exceed the previously received network information by the threshold.

An embodiment of the present invention is capable of reducing an amount of storage space required for network information by comparing network information for a time period with network information from previous time periods. An indication of the network information for the time period is saved if the network information for the time period exceeds the network information from previous time periods by -a threshold.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 5 illustrates a base table according to one embodiment of the present invention;

FIG. 6 illustrates a log table according to one embodiment of the present invention;

FIG. 7 illustrates a rate table according to one embodiment of the present invention;

FIG. 8 illustrates a rate log according to one embodiment of the present invention;

FIG. 10 illustrates a signature table according to one embodiment of the present invention;

FIG. 11 illustrates a change log according to one embodiment of the present invention;

FIGS. 13a, 13b, and 13c are graphical representations of cognitive signatures and current data that illustrate when entries are made to a change log according to one embodiment of the present invention;

FIG. 15 illustrates a base configuration table according to one embodiment of the present invention;

FIG. 16 illustrates a configuration log according to one embodiment of the present invention.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, protocols, components, and circuits have not been described in detail so as not to obscure the invention.

The present invention is related to intelligent storage and reduction of network information. According to one embodiment of the present invention, various information regarding the performance and operation of a network(s) is obtained from the network devices and/or applications at regular or irregular intervals and is temporarily stored. Various reduction techniques are employed on such temporarily stored information in order to reduce the amount of storage space required to maintain such information. These reduction techniques are based on the actual information received from devices and/or applications over time, and operate to reduce the amount of data storage space required while concurrently avoiding loss of any substantial amount of information.

Figure 1:
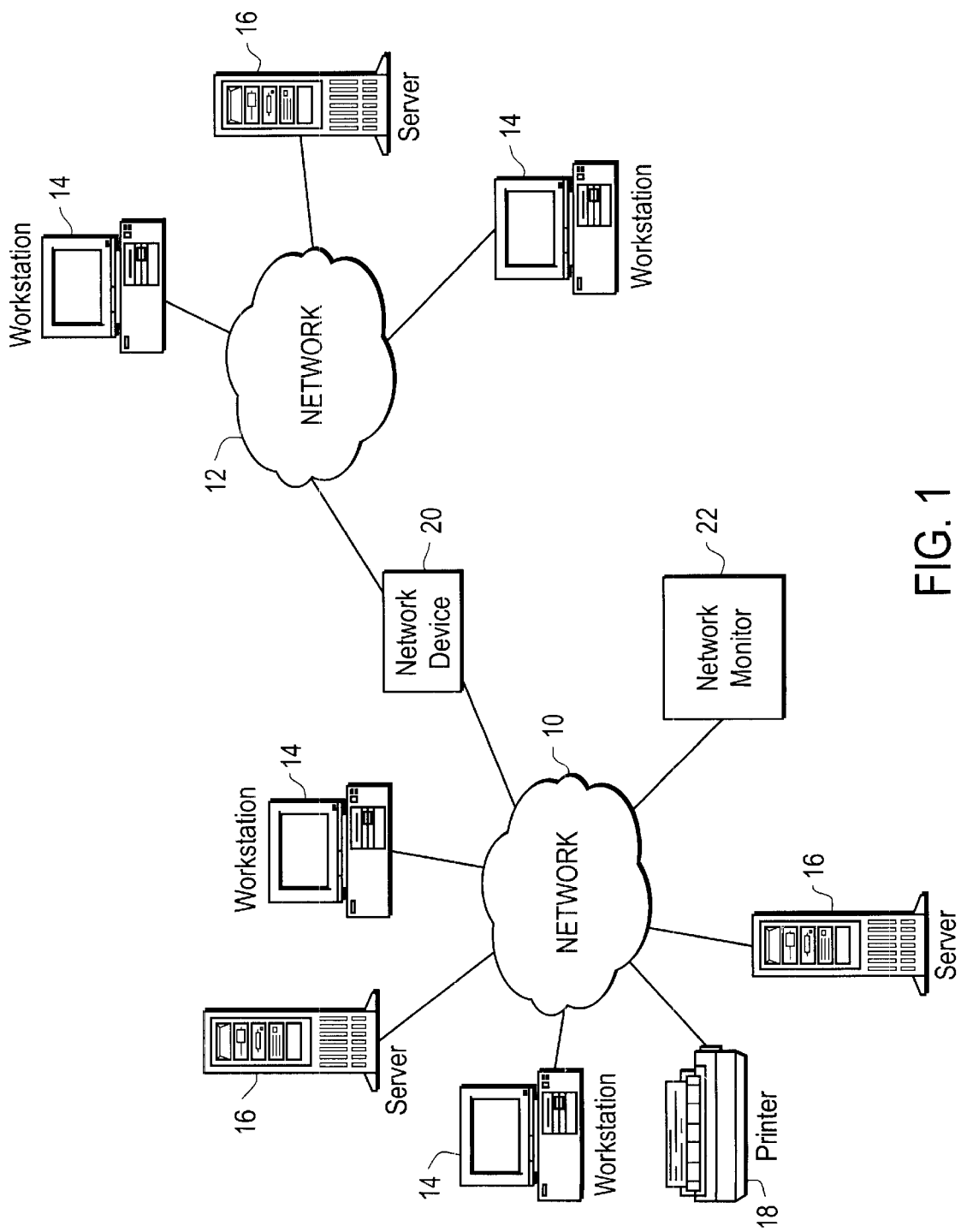
FIG. 1 illustrates an embodiment of a network environment in which the present invention can be implemented.

FIG. 1 illustrates an embodiment of a network environment in which the present invention can be implemented. The network environment of FIG. 1 contains multiple network devices coupled to one another using a pair of networks 10 and 12. In particular, multiple workstations 14 and servers 16 are coupled to network 10. Additionally, a printer 18 and a network monitor 22 are coupled to network 10. A network device 20 (such as a router, bridge, switch or gateway) is coupled to both network 10 and network 12. Network device 20 allows network data to be exchanged between network 10 and network 12, thereby allowing network devices coupled to network 10 to communicate with other network devices coupled to network 12. Additional workstations 14 and a server 16 are also coupled to network 12. Although FIG. 1 shows four workstations and three servers, a particular network environment may contain any number of workstations, servers, printers, or other network devices interconnected with one another in any configuration. Networks 10 and 12 may use any communication protocol and may utilize any network topology. Additionally, network 10 and network 12 may use different protocols and different network topologies. If different protocols or different topologies are used, then network device 20 is required to translate or otherwise convert data between the two different protocols or two different topologies.

Network monitor 22 is coupled to network 10, but is capable of monitoring network devices, interfaces, and communication links associated with network 10 as well as network 12. Network monitor 22 is also able to monitor the operation and performance of various sub-systems, components, or applications contained within a network device. For example, network monitor 22 can monitor the CPU performance, memory utilization, and application response time of workstations and servers contained in the network environment. Although a single network monitor 22 is shown in FIG. 1, in an alternate embodiment of the invention, a separate network monitor is coupled to network 12. In this embodiment, network monitor 22 monitors network devices, interfaces, and communication links associated with network 10, while the network monitor coupled to network 12 monitors network devices, interfaces, and communication links associated with network 12. In other embodiments of the invention, a single network monitor 22 is capable of monitoring network devices, interfaces, and communication links associated with three or more different networks.

FIG. 1 illustrates an exemplary network environment. Those skilled in the art will appreciate that the teachings of the present invention can be used with any number of network environments and network configurations. Furthermore, the teachings of the present invention can be used to reduce and store information corresponding to any network device, system, component, or application for which information can be gathered, either directly or indirectly. Additionally, the present invention is capable of storing information regarding any communication link or interface within a network or between a network and a network device. Although FIG. 1 illustrates network monitor 22 as a separate network device, network monitor 22 may be incorporated into another network device, such as server 16.

Figure 2:
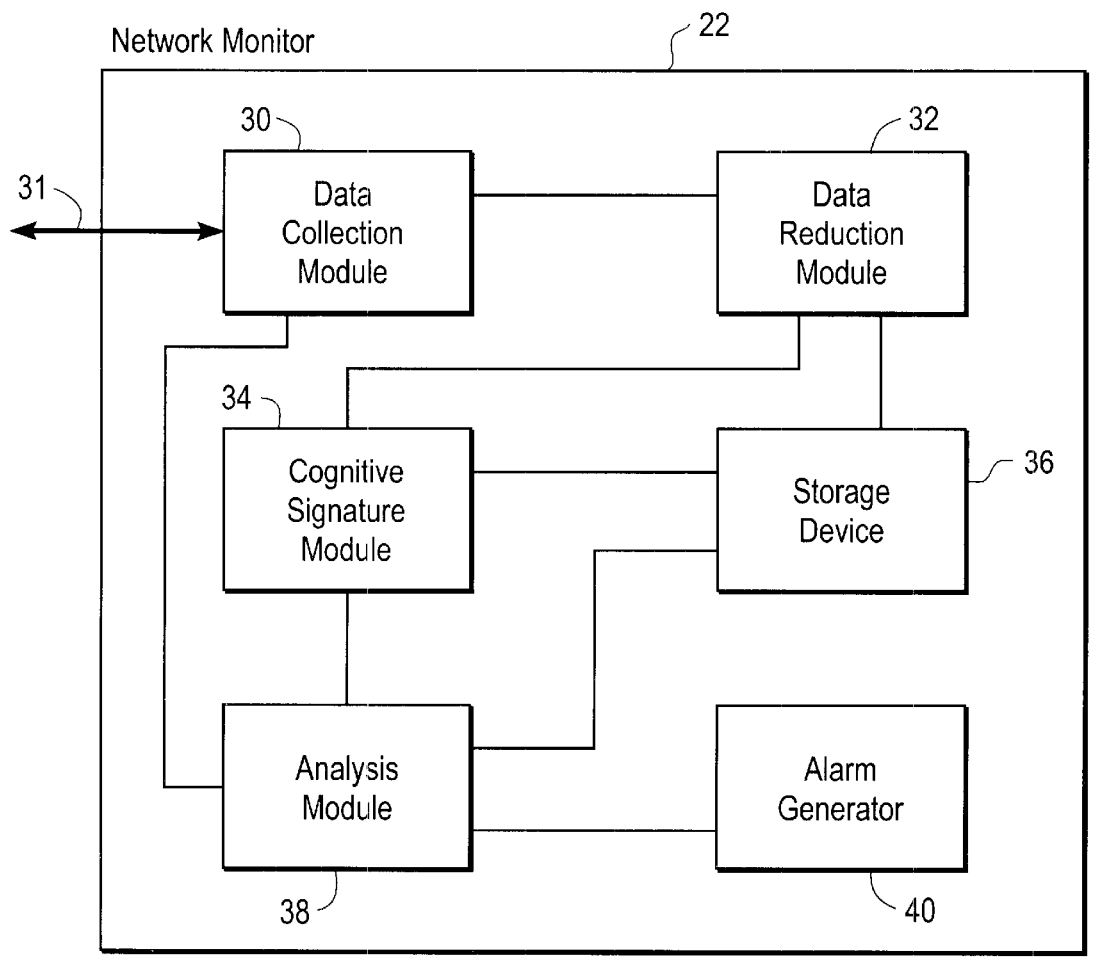
FIG. 2 illustrates one embodiment of a network monitor capable of detecting problems or potential problems in a network environment.

FIG. 2 illustrates an embodiment of a network monitor 22 capable of detecting problems or potential problems in a network environment. Network monitor 22 includes a data collection module 30 that collects information from various devices or applications, such as information regarding network utilization (or device utilization), lost packets, response time, number of errors, device configuration, etc. Data collection module 30 collects information regarding the operation or performance of the network environment on one or more communication links 31. Data collection module 30 can collect data from any number of networks and any number of network devices or applications. Data collection module 30 is coupled to a data reduction module 32, which reduces the collected data by reducing the granularity of the data over time and performing statistical reduction of the data, as discussed in more detail below.

Data reduction module 32 is coupled to a cognitive signature module 34 and a storage device 36. Cognitive signature module 34 generates and maintains multiple dynamic cognitive signatures based on the data collected from the network. A cognitive signature represents the normal operating mode for a particular network device, network interface, system, application, or communication link with which the cognitive signature is associated. The cognitive signature is based on actual historical data collected regarding the operation and performance of the network environment. The cognitive signature is dynamic, such that it is continually updated to include the most recent data collected by the data collection module.

In a particular embodiment of the invention, a separate cognitive signature is provided for each day of the week. A cognitive signature for a particular day of the week may include data separated into multiple time periods (e.g., each hour of the day). For example, a cognitive signature for Tuesday may include a particular time period that represents the normal operating mode (based on collected historical data) for a particular network device from 9:00 a.m. to 10:00 a.m. on Tuesday. A cognitive signature for Saturday may include a time period that represents the normal operating -mode for a particular network interface from 2:00 p.m. to 3:00 p.m. on Saturday.

In the embodiment of FIG. 2, cognitive signature module 34 receives data from data reduction module 32. In this embodiment, the granularity of the collected data has already been reduced when received by cognitive signature module 34. In an alternate embodiment of the invention, cognitive signature module 34 may receive data directly from data collection module 30. In this alternate embodiment, cognitive signature module 34 receives the actual data collected, rather than a reduced set of data. Thus, the cognitive signatures can be generated using the actual data without any loss of detail due to averaging or other data reduction procedures.

Storage device 36 can be any type of device capable of storing data, such as a random access memory (RAM), disk drive, or tape drive. In the illustrated embodiment, storage device 36 is part of network monitor 22. In an alternate embodiment, storage device 36 is separate from monitor 22 and may be accessible by monitor 22, for example, via network 10 and possibly network 12 of FIG. 1.

Storage device 36 is capable of receiving data from data reduction module 32, cognitive signature module 34, and an analysis module 38. Analysis module 38 receives collected data from data collection module 30, and receives one or more cognitive signatures from cognitive signature module 34. Analysis module 38 analyzes current performance or operation of the network environment by comparing the data collected via the network with the cognitive signatures, which represent past performance or operation of the network environment at similar times for similar devices, systems, or applications. Analysis module 38 may also compare the current data collected with one or more threshold values. Analysis module 38 is coupled to an alarm generator 40. Based on the results of the analysis performed by analysis module 38, an alarm signal may be communicated to alarm generator 40. In response to the alarm signal, alarm generator 40 may generate an e-mail message to a network administrator or other personnel, initiate a page to a network administrator's pager, or communicate the alarm information to another system or application. Additionally, alarm generator 40 may initiate a pre-programmed procedure that is executed in response to a particular type of alarm.

Figure 3:
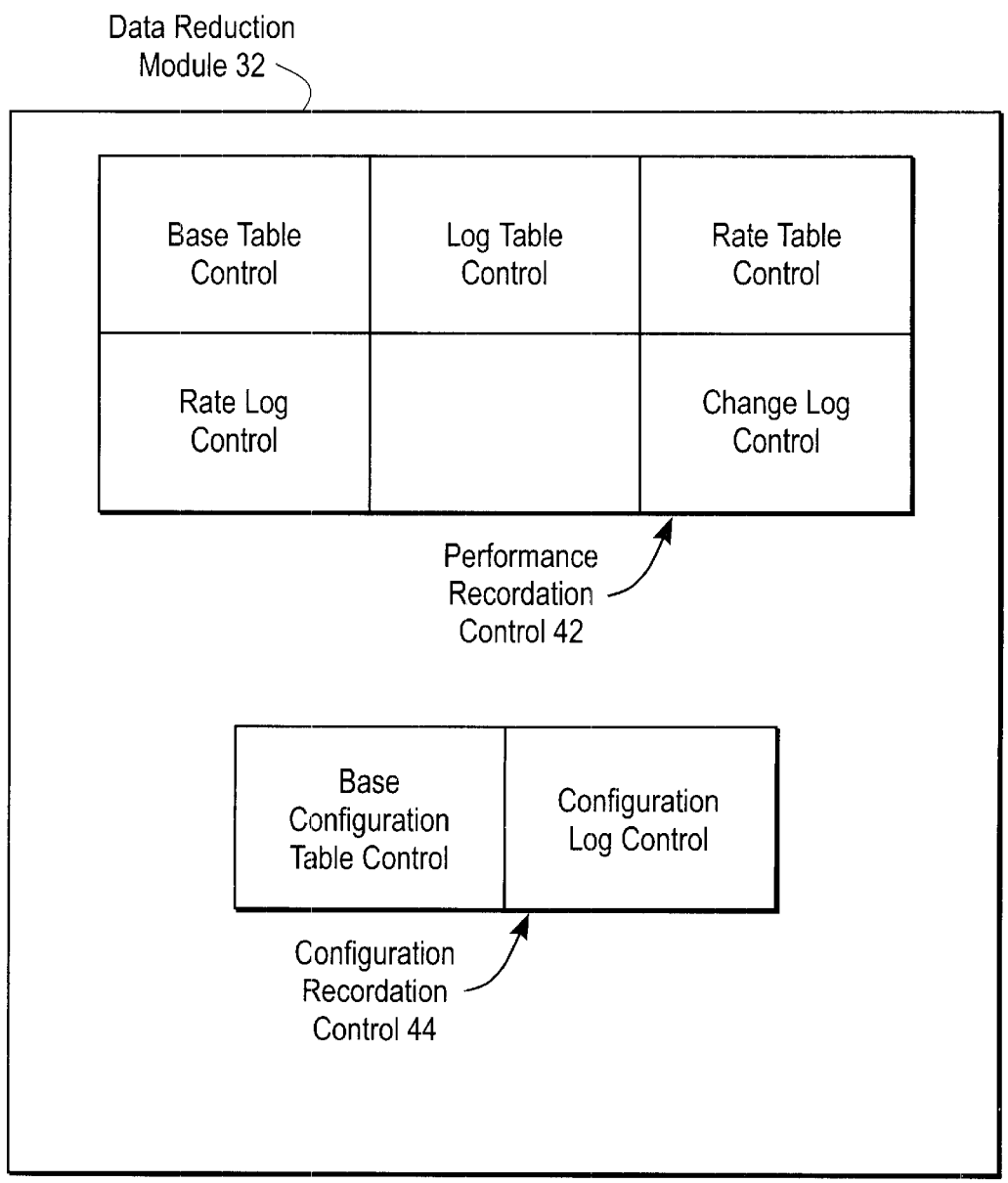
FIG. 3 illustrates a data reduction module according to one embodiment of the present invention.

FIG. 3 illustrates a data reduction module 32 according to one embodiment of the present invention. Reduction module 32 includes performance recordation control 42 to generate and update as necessary the various tables and logs maintained for storage of information regarding network performance in accordance with the present invention. Reduction module 32 also includes configuration recordation control 44 to generate and update as necessary the various tables and logs maintained for storage of information regarding network configuration in accordance with the present invention.

Figure 4:
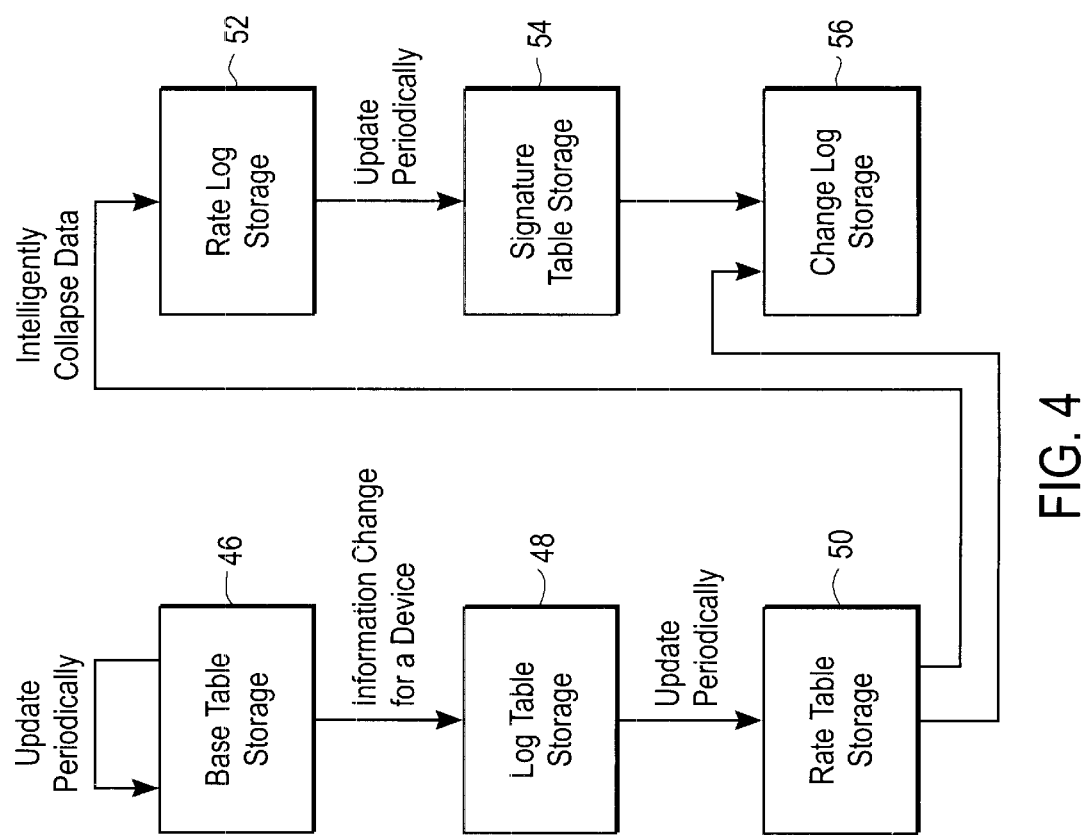
FIG. 4 is a flow diagram illustrating the storage of performance and operation information from the devices and applications in the network according to one embodiment of the present invention.

FIG. 4 is a flow diagram illustrating the storage of performance and operation information from the devices and applications in the network according to one embodiment of the present invention. In the illustrated embodiment, the data storage of FIG. 4 is carried out by performance recordation control 42 of FIG. 3 in conjunction with cognitive signature module 34 of FIG. 2. Performance and operation data is maintained by recordation control 42 through use of multiple tables and logs. Over time, and as performance and operation information changes, information is transferred from one table or log to another, with the amount of data that is stored being reduced along the way. In the illustrated embodiment, a base table, a log table, a rate table, a rate log, and a change log are maintained by performance recordation control 42 for storage of network performance information, and a signature table is maintained by cognitive signature module 34. Each of these tables and logs is discussed in more detail below.

In the discussions below, reference is made to a single set of tables and logs which maintains performance and operation information for the network. According to one implementation, the tables and logs are separated into two sets, one of which maintains device response time, and the second of which maintains the other "interface" data, such as number of packets or bytes received and/or sent number of input or output errors, etc.

Performance and operation information is received from data collection module 30 of FIG. 1 at regular or irregular intervals and is used to update the base table as necessary, block 46. According to one implementation, such information is received approximately every five minutes from data collection module 30. Base table 60 of FIG. 5 illustrates a base table according to one embodiment of the present invention. Base table 60 provides a "snapshot" of the current network performance and operation (that is, the performance and operation information as last collected by data collection module 30). Base table 60 includes one row for each of the devices or applications in the network environment for which performance and/or operation information is received from collection module 30 (column 62) and maintains multiple (x) pieces of performance and operation information for each device (columns 64). The information maintained in columns 64 is that which is obtained, either directly or indirectly, by data collection module 30. Examples of such information include, but are not limited to, number of bytes or packets received and/or sent, input and/or output data discarded, input and/or output errors, number of unidentifiable packets received, output queue length, etc.

When new performance information is received from data collection module 30, performance recordation control 42 compares the newly received information for the device with the current information stored for that device in base table 60. If the new information does not exceed the currently stored information by a threshold amount, then the timestamp (column 66) for that device is updated to be the current time (that is, the time of receipt of the new information from data collection module 30). However, if the new information exceeds the currently stored information by at least the threshold amount, then performance recordation control 42 updates the log table, block 48.

In the illustrated embodiment, for purposes of determining whether to update the log table (block 48), the threshold amount identifies a particular percentage of the current stored information (for example, 10%). The specific percentage can be device dependent, or alternatively can be the same for all devices. By way of example, if the percentage is 10% and the currently stored information is a value of 20, then new information indicating a value of less than 18 or greater than 22 would cause an update in the log table.

Log table 68 of FIG. 6 illustrates a log table according to one embodiment of the present invention. Log table 68 provides temporary storage for performance information until the rate table (e.g., table 78 of FIG. 7 discussed below) can be updated. Log table 68 can include multiple rows of information for each device in the network environment (column 70). The performance information stored by log table 68 in columns 72 is the same as that in columns 64 of base table 60. Log table 68 includes a start time (column 74) and end time (column 76) for each device entry. Thus, a particular row of log table 68 includes performance information corresponding to a particular device or application in the network environment for a particular period of time.

The information from log table 68 is used to periodically update a rate table, block 50. A rate table 78 according to one embodiment of the present invention is illustrated in FIG. 7. Rate table 78 maintains the minimum, average, and maximum performance information until rate log 88 of FIG. 8 and change log 116 of FIG. 11, both discussed below, can be updated. Rate table 78 includes up to one row per device or application in the network environment (column 80). A start time (column 84) and an end time (column 86) is maintained for each entry. In the illustrated implementation, the start and end times cover one-hour periods (e.g., 8:00 a.m.–9:00 a.m., 9:00 a.m.–10:00 a.m., etc.), so that rate table 78 has a granularity of one hour. For each piece of performance information in columns 72 of log table 68, the minimum and maximum values are identified and the average value is calculated for each time period. The average values can be calculated either with or without regard for the duration of such values. For example, if a particular piece of information had a value of 2 from 8:00 a.m. to 8:45 a.m., and a value of 8 from 8:45 a.m. to 9:00 a.m., the average could be calculated without regard for time (e.g., the value of (2+8)/2, or 5), or with regard for the time (e.g., the value of (2×45+8×15)/60, or 3.5).

Due to the maintenance of data on an hourly basis in rate table 78, information more than an hour old need not be maintained in log table 68. Thus, each hour when rate table 78 is updated, only the most recent entry for a device need be maintained in log table 68. For example, if log table 68 includes one entry for a particular device from 8:00 a.m. to 8:45 a.m., and a second entry for that device from 8:45 a.m. to the current time (i.e., 9:00 a.m.), then the first entry covering the 8:00 a.m. to 8:45 a.m. information can be deleted once rate table 78 is updated. Furthermore, all "current" time entries in log table 68 are updated to the current time after rate table 78 is updated. This updating is done to ensure that accurate information can be stored in rate table 78 at hourly intervals. Again, using the preceding example, the information from the first entry (8:00 a.m. to 8:45 a.m.) and the second entry (8:45 a.m. to the current time, 9:00 a.m.) is used to generate the 8:00 a.m. to 9:00 a.m. entry for the device in rate table 78. Since the next entry that will be generated for that device in rate table 78 is for the time period 9:00 a.m. to 10:00 a.m., the current entry in log table 68 is updated so that the start time is 9:00 a.m. (all other information in the entry is left unchanged). Alternatively, rather than updating current time entries, the start time could remain unchanged and earlier times can simply be ignored when updating rate table 78.

The performance information from rate table 78 is used to update a rate log, block 52 of FIG. 4. A rate log 88 according to one embodiment of the present invention is illustrated in FIG. 8. Rate log 88 maintains the same minimum, average, and maximum values for a device for a given time period as are maintained by rate table 78. However, multiple rows (entries) per device or application can be maintained, and the time periods are not limited to a particular granularity (e.g., hourly, as is done in rate table 78).

Performance and operation information is intelligently collapsed. from rate table 78 into rate log 88. In the illustrated embodiment, information is collapsed from rate table 78 into rate log 88 at the same granularity as rate table 78, which is hourly. When collapsing information into rate log 88, performance recordation control 42 of FIG. 3 either creates a new entry in rate log 88 for the performance and/or operation information for a device from rate table 78, or updates the end time for the device in rate log 88.

Figure 9:
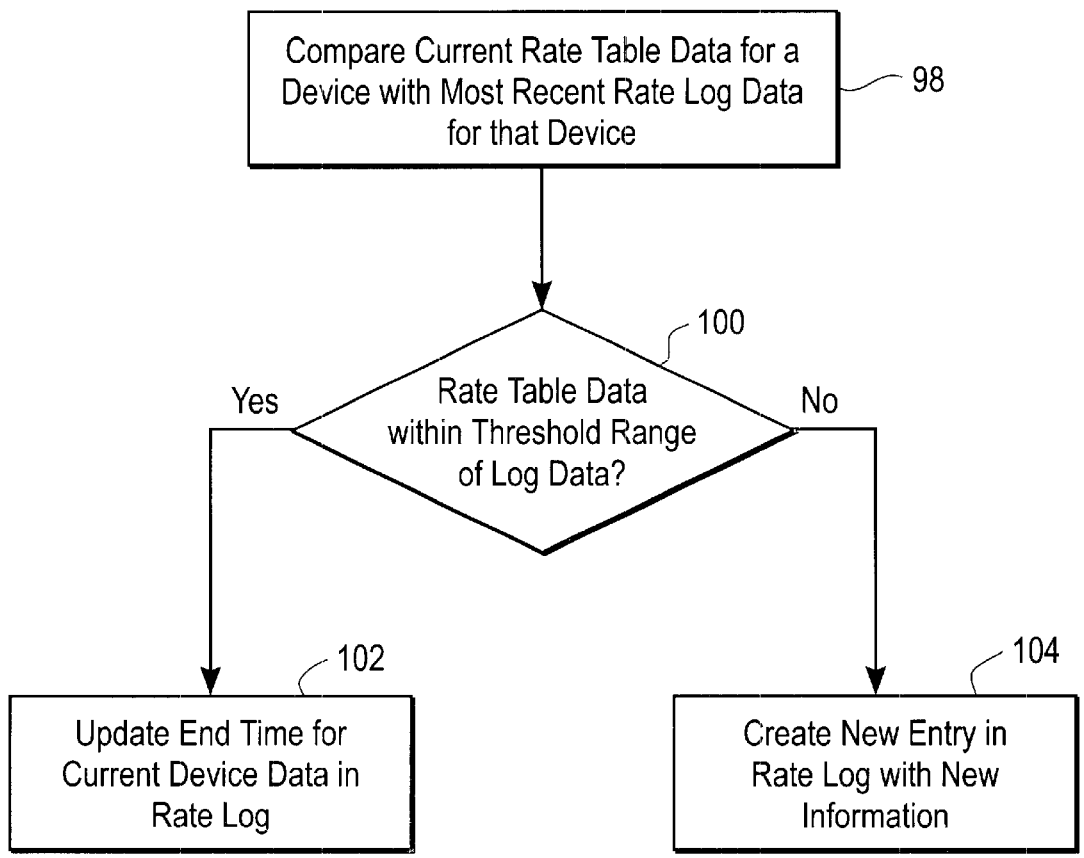
FIG. 9 is a flowchart illustrating the process of determining whether to create a new entry in a rate according to one embodiment of the present invention.

FIG. 9 is a flowchart illustrating the process of determining whether to create a new entry in rate log 88 or update a previous entry according to one embodiment of the present invention. As illustrated, performance recordation control 42 compares the current information from rate table 78 for a device with the most recent log data (from rate log 88) for that device, step 98, and checks whether the current information is within a threshold range of the most recent log data, step 100. If the current information is within the threshold range, then the end time for the current device is updated in rate log 88, step 102. However, if the current performance information is not within the threshold range, then a new entry is created in rate log 88 with the new information.

In the illustrated embodiment, the threshold range of step 100 is a. small measurable finite change typically less than 1% to 2%. In alternate embodiments, different threshold ranges can be used, balancing the desire to reduce the frequency of creating new log entries against the desire to maintain accurate information. It is to be appreciated that the threshold ranges can vary for different devices and as well as different pieces of network information. By way of example, the threshold range for data(1) of device 1 may be ±2%, while the threshold range for data (2) of device 1 may be ±5%. Using this example, if the current data(1) is not within ±2% of the log data(1), or if the current data(2) is not within ±5% of the log data(2), then a new entry is created in the log table (step 104).

The process of FIG. 9 can be further described by the following example. Assume that the most recent log data in rate log 88 for average response time for a particular device indicates 2.00 seconds, that the time period for that entry is from 8:00 a.m. on Dec. 1, 1997 through 5:00 p.m. on Dec. 3, 1997, and that the threshold value for the response time of that device is 5%. If the current rate table information (assume the information is for Dec. 3, 1997 from 5:00 p.m. to 6:00 p.m.) indicates an average response time of 2.02 seconds, which is within the threshold value of 5% of the logged 2.00 seconds, then the end time for the time period in rate log 88 is updated to the end time for the current rate table information, thereby changing the entry in rate log 88 to indicate an average response time for the device of 2.00 seconds with a time period from 8:00 a.m. on Dec. 1, 1997 through 6:00 p.m. on Dec. 3, 1997. However, if the current performance information indicates an average response time of 15.00 seconds, which is not within the threshold value of 5% of the logged 2.00 seconds, then the current entry in rate log 88 remains unchanged and a new entry in rate log 88 is created, indicating an average response time for the device of 15.00 seconds with a time period from 5:00 p.m. on Dec. 3, 1997 through 6:00 p.m. on Dec. 3, 1997.

Additionally, according to one embodiment of the present invention, performance recordation control 42 also filters out various "special occurrences" when updating rate log 88. Such special occurrences include, for example, network down time and other rare events. Such special occurrences are filtered out because they do not represent "typical" network operation and could improperly skew the log data of rate log 88. Thus, for example, if an entire network is brought down for maintenance for two hours, that two-hour period is ignored by performance recordation control 42 when updating rate log 88 so as not to improperly skew the data for a time period when the network was not operational.

Such "special occurrences" can be manually input to performance recordation control 42 of network monitor 22, or alternatively can be automatically detected by network monitor 22. According to one implementation, such special occurrences are automatically detected by performance recordation control 42 as being those times when the current data deviates significantly from the cognitive signature (e.g., deviates enough to cause analysis module 38 of FIG. 2 to communicate an alarm signal-to alarm generator 40).

Thus, it can be seen that performance recordation control 42 intelligently updates rate log 88, creating new entries only when there is a significant enough change, and otherwise merely updating time periods. Such intelligent control reduces the amount of information stored by only storing that which differs significantly enough from previously stored data. Additionally, by intelligently making such decisions on a device-by-device basis, changes in performance information of a device which are significant are maintained without needlessly storing excess data for insignificant changes in performance information of other devices.

The performance and operation information stored in rate log 88 is also used to update a signature table (also referred to as a baseline table), block 54 of FIG. 4. A signature table 106 according to one embodiment of the present invention is illustrated in FIG. 10. In the illustrated embodiment, signature table 106 is maintained by cognitive signature module 34 of FIG. 2. However, in alternate embodiments signature table 106 may be maintained by data reduction module 32 of FIG. 2.

In the illustrated embodiment, signature table 106 stores 168 entries per device (column 108), one entry per hour covering a one-week period. The start time and end time (columns 112 and 114) indicate one-hour periods over a course of a week. Columns 110 provide minimum, average, and maximum values for the performance information for each device over the one-week period.

According to one embodiment of the present invention, the values in signature table 106 are generated using a moving average computation. The moving average computation is a weighted average calculation, multiplying the current value stored in signature table 106 by a first weight (e.g., 0.9), and multiplying the current rate log 88 value by a second weight (e.g., 0.1), then adding these weighted values together to generate the new baseline value. Such moving average techniques are well-known to those skilled in the art and thus will not be discussed further except as they pertain to the present invention.

Performance recordation control 42 uses the values from the signature table 106 in conjunction with the values from the rate table 78 to update a change log as necessary, block 56 of FIG. 4. Change log 116 of FIG. 11 illustrates an example change log according to one embodiment of the present invention. Change log 116 maintains a record of when performance information was detected as deviating from the cognitive signature. Change log 116 includes attribute information (column 118) identifying which network device or application deviated from the cognitive signature. Type information (column 120) identifies which piece of performance and/or operation information varied from its cognitive signature. Amount information (column 122) is also maintained to indicate the amount by which the information varied from its cognitive signature (e.g., a percentage change). Time information (column 124) is also maintained to indicate a particular start and end date and time of when the deviation occurred. According to one implementation change log 116 is initialized with an initial entry for each device indicating that no deviation from the cognitive signature currently exists. (e.g., the amount information indicates zero).

In the illustrated embodiment, change log 116 is updated at the same granularity as rate table 78, which is hourly. Alternatively, change log 116 may be updated at a different granularity, such as more frequently (e.g., every five minutes) to more accurately identify the exact time when changes occur.

Figure 12:
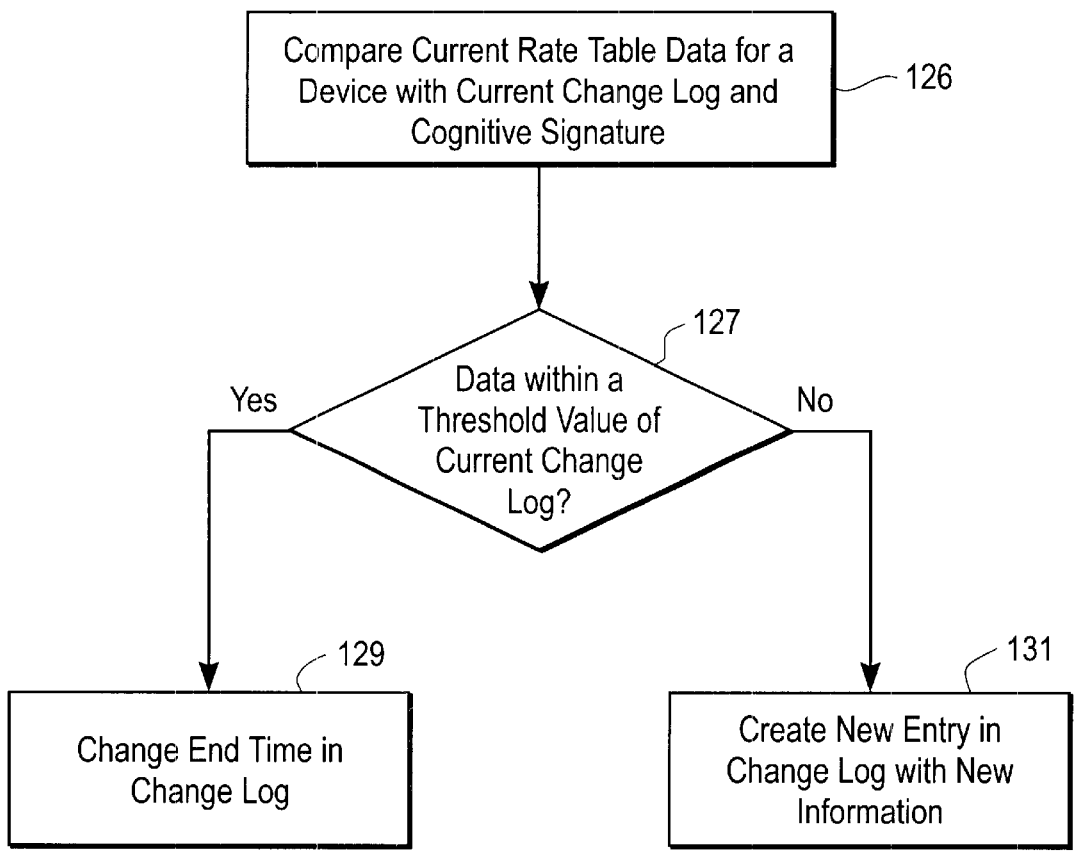
FIG. 12 is a flowchart illustrating the process of deciding when to update the change log according to one embodiment of the present invention.

FIG. 12 is a flowchart illustrating the process of deciding when to update the change log according to one embodiment of the present invention. As illustrated, performance recordation control 42 compares the current rate table data for a device with the change log and cognitive signature, step 126. Recordation control 42 then checks whether the current rate table data is within a threshold range of the current change log data, step 127. In other words, recordation control 42 compares the cognitive signature, as modified by any current changes indicated in the change log, to the current rate table data. If the current rate table data is within the threshold range, then the end time in the change log is changed to indicate the current time, step 129. It should be noted that in step 129 a new change log entry is not created. Thus, the currently pending change log entries record the difference between the current rate data and the cognitive signature for the devices.

Returning to step 127, if the data is not within the threshold range, then the end of a change is identified. Recordation control 42 updates the end time of the current change log entry and creates a new entry in the change log to identify the new deviation from the cognitive signature, step 131.

In the illustrated embodiment, the current cognitive signature is used in the calculation each time a comparison is made in step 127. Thus, any changes in the cognitive signature over time will be taken into account for determination of the end time of a particular change.

According to one embodiment of the present invention, when performance recordation control 42 performs the comparison of step 126, the comparison is based on the cognitive signature and change log data current time plus or minus one hour. Thus, if the current data is not within a threshold range of the cognitive signature/change log data for the current time, however it is within a threshold range of the cognitive signature/change log data for some point plus or minus one hour of the current time (e.g., 58 minutes ahead or behind the current time), then a new change log entry is not created.

FIGS. 13a–13c are graphical representations of cognitive signatures and current data that illustrate when entries are made to change log 116 according to one embodiment of the present invention. In FIG. 13a, a cognitive signature 134 and rate table data 136 are illustrated over a period of time. At time $t_1$, a significant enough difference between the cognitive signature and the rate table data exists to exceed the threshold value, causing an entry in change log 116 to be created. However, between time $t_1$ and time $t_2$, the rate table data 136 is substantially the same as the cognitive signature 134 increased by the amount of change at time $t_1$. Thus, no additional entries are made in change log 116 until time $t_2$, when the end time for the change is identified.

In FIG. 13b, a cognitive signature 138 and rate table data 140 are illustrated over a period of time. At time $t_3$, the cognitive signature 138 increases followed shortly thereafter by an increase in the rate table data 140 at time $t_4$. Although the rate table data 140 increase at time $t_4$ is not as large as the rate table data 140 increase at time $t_3$, the value of the rate table data 140 at time $t_4$ is close enough to the value of cognitive signature 138 so as not to exceed the threshold value. Similarly, the subsequent increase in rate table data 140 at time $t_5$, which moves rate table data 140 closer to cognitive signature 138, does not exceed the threshold value. Thus, no entries are made in change log 116 in the example of FIG. 13b because the rate table data 140 does not exceed the threshold value over the time period illustrated.

In FIG. 13c, a cognitive signature 142 and rate table data 144 are illustrated over a period of time. Although the rate table data 144 lags behind the cognitive signature 142 somewhat, the change is not significant enough for the rate table data to exceed the threshold value. Furthermore, as illustrated in FIG. 13c, the amount of change of the rate table data 144 from the cognitive signature is "shifted" less than one hour. Thus, no change log entries are made.

As illustrated in FIGS. 13a–13c, using the change log entries, as well as the cognitive signature 134, an approximation of the actual data observed can be reconstructed without having had to actually provide long-term storage of the rate table data 136. It should be noted, however, that such reconstructed "actual data" would have a margin of error equal to the threshold value.

Thus, it can be seen from FIGS. 12 and 13a–13c that new entries in change log 116 are created only when needed to identify a change greater than a threshold amount from the previous operation. When changes are less than a threshold amount different from the previous operation, end times for the change log entries are updated without having to create new entries, thereby reducing storage space requirements.

Figure 14:
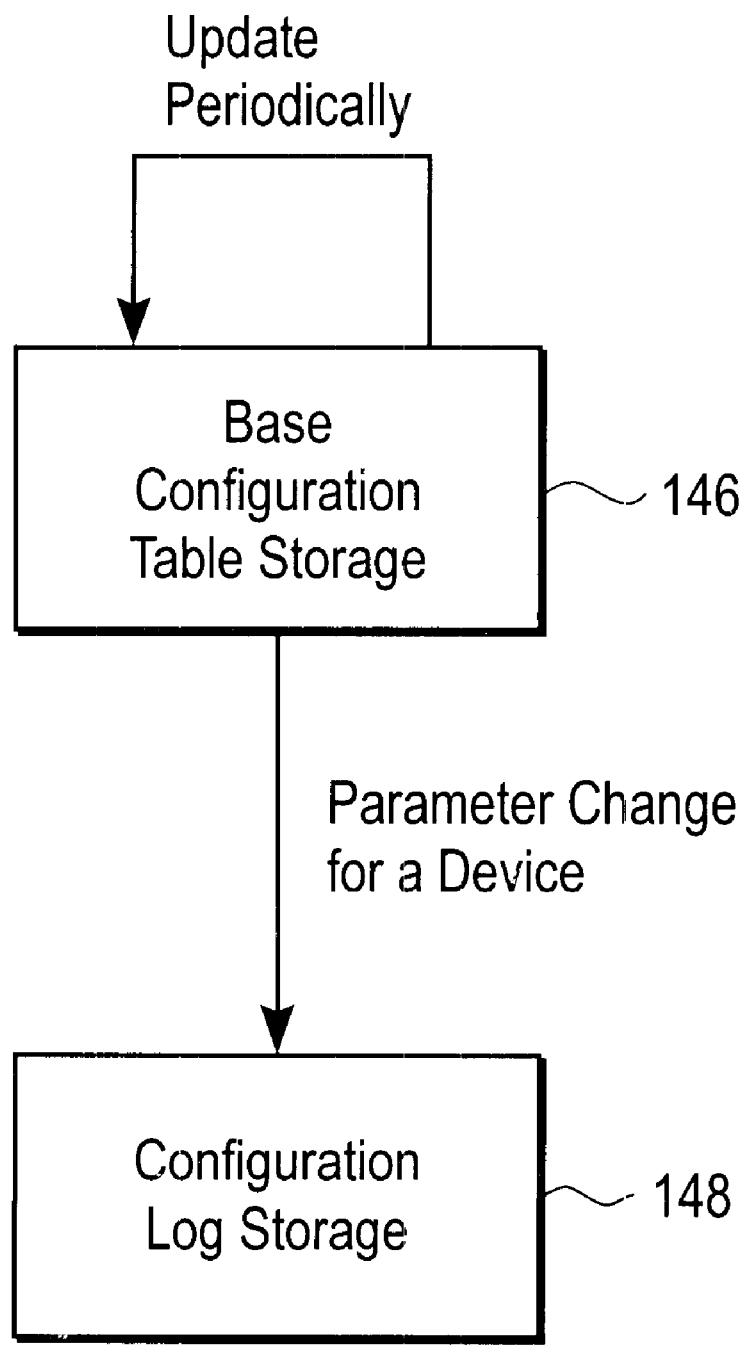
FIG. 14 is a flow diagram illustrating the storage of configuration information from the devices and applications in the network according to one embodiment of the present invention.

FIG. 14 is a flow diagram illustrating the storage of configuration information from the devices and applications in the network according to one embodiment of the present invention. In the illustrated embodiment, the data storage of FIG. 14 is carried out by configuration recordation control 44 of FIG. 3. Configuration data is maintained by recordation control 44 through the use of a base configuration table and a configuration log, as discussed in more detail below.

Configuration data is periodically received from data collection module 30 of FIG. 1 and is used to update the base table as necessary, block 146. Base configuration table 150 of FIG. 15 illustrates a base configuration table according to one embodiment of the present invention. Base configuration table 150 provides a "snapshot" of the current network configuration (that is, the network configuration as last identified by data collection module 30). Base configuration table 150 includes one row for each of the possible devices in the network environment (column 152) and maintains, .multiple (×) configuration parameters for each device (columns 154). The parameters maintained in columns 154 are those that are obtained, either directly or indirectly, by data collection module 30. Examples of such parameters include, but are not limited to, amount of memory, operating speed, operational and/or administrative status, operating system type and/or version, etc.

When new configuration information is received from data collection module 30, configuration recordation control 44 compares the newly received configuration information for the device with the current configuration information stored for that device in base configuration table 150. If the new information is the same as the currently stored information, then the timestamp (column 156) for that device is updated to be the current time and date (that is, the time of receipt of the new information from data collection module 30). However, if the new information is not substantially the same as the currently stored information, then configuration recordation control 44 updates the configuration log, block 148 of FIG. 14.

Configuration log 158 of FIG. 16 illustrates a configuration log according to one embodiment of the present invention. Configuration log 158 provides storage of changes in the configuration of the network. Configuration log table 158 can include multiple rows of information for each device in the network environment (column 160). The configuration information stored by configuration log 158 in columns 162 is copied from columns 154 of base configuration table 150. Configuration log 158 includes a timestamp (column 164) for each device entry.

By updating configuration log 158 each time the network configuration changes, the combination of configuration log 158 and base configuration table 150 can reconstruct the configuration of the network at previous points in time. Base configuration table 150 provides the "current" configuration, and the appropriate changes can be made to identify a previous network configuration by searching for appropriate entries in configuration log 158.

By way of example, assume that the "current" time is 8:00 a.m. on Jul. 1, 1998. If a user desires to know the configuration of the network on Jan. 1, 1998 at 8:00 a.m., then configuration log 158 need simply be searched for any changes which occurred after Jan. 1, 1998 at 8:00 a.m. By working "backwards" from base configuration table 150, any such identified changes can be "reversed" and a table generated of the network configuration as it existed on Jan. 1, 1998 at 8:00 a.m.

Figure 17:
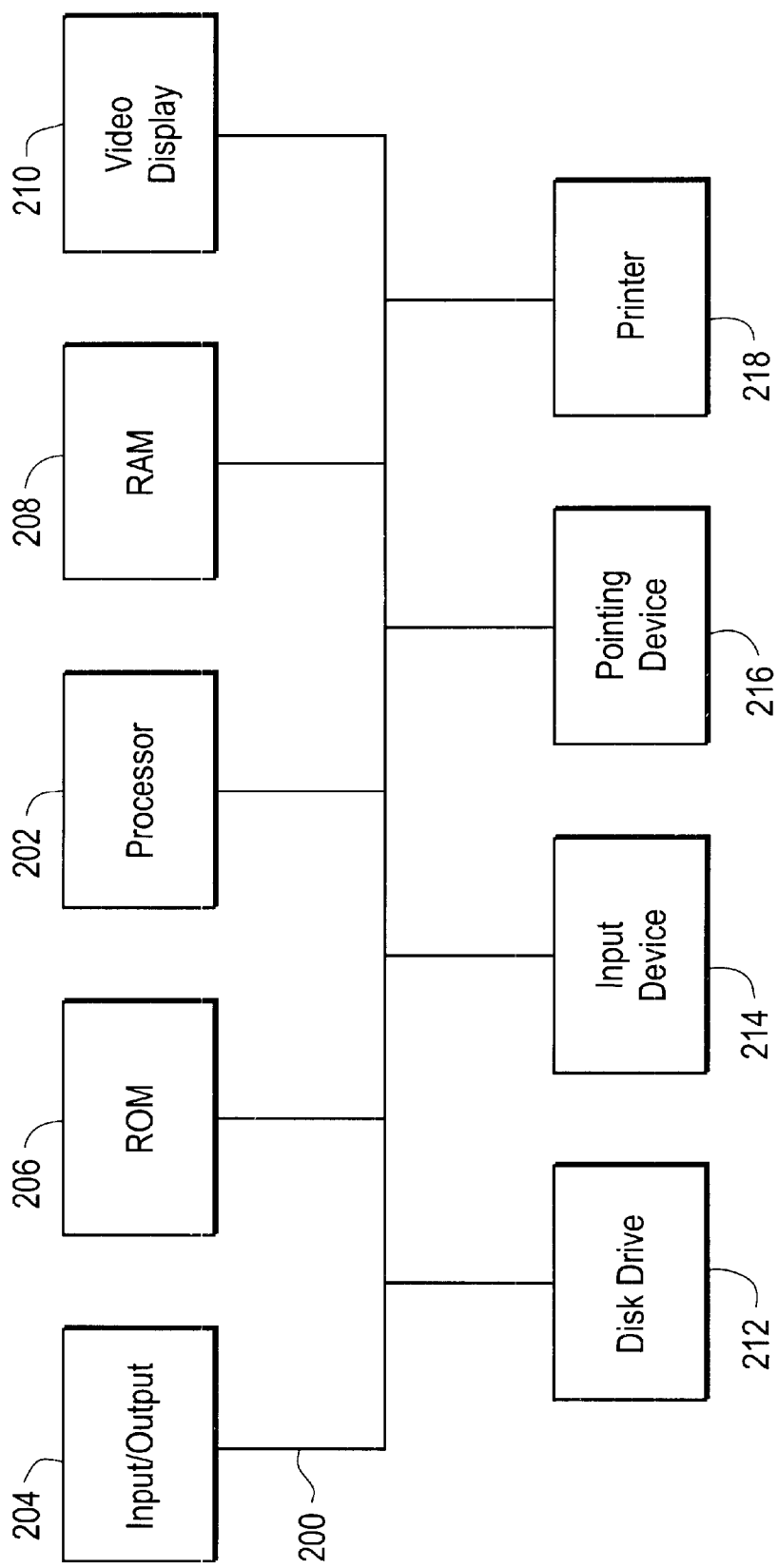
FIG. 17 illustrates an embodiment of a computer system that can be used with the present invention.

FIG. 17 illustrates an embodiment of a computer system that can be used with the present invention. For example, embodiments of the invention may use a computer of the type shown in FIG. 17 for a network monitor, a network device, a server, or any other device contained in or used with the monitoring system discussed above. The various components in FIG. 17 are provided by way of example. Certain components of the computer in FIG. 17 can be deleted for particular implementations of the invention. The computer system shown in FIG. 17 may be any type of computer, including a general purpose computer.

FIG. 17 illustrates a system bus 200 to which various components and devices are coupled. A processor 202 performs the processing tasks required by the computer. Processor 202 may be any type of processing device capable of implementing the steps necessary to perform the various procedures and operations discussed above. An Input/Output (I/O) device 204 provides a mechanism for communicating with other devices coupled to the computer. A Read-Only Memory (ROM) 206 and a Random Access Memory (RAM) 208 provide a storage mechanism for various data and information used by the computer. Although ROM 206 and RAM 208 are shown coupled to bus 200, in alternate embodiments, ROM 206 and RAM 208 are coupled directly to processor 202 or coupled to a dedicated memory bus (not shown).

A video display 210 displays various information and data to the user of the computer. A disk drive 212 provides a mechanism for the long-term mass storage of information. An input device 214 and a pointing device 216 allow the user of the computer to enter information and commands to the computer system. Input device 214 may be, for example, a keyboard, keypad, handwriting recognition device, or voice recognition device. Pointing device 216 includes, for example, a mouse, track ball, or touch pad. A printer 218 is capable of creating a hard copy of information generated by or used by the computer.

Embodiments of the present invention may be implemented using a machine-readable medium containing various sets of instructions, code sequences, configuration information, and other data used by a computer or other processing device (e.g., the computer system of FIG. 17). The various information stored on the machine-readable medium is used to perform various monitoring, analysis, communication, and processing functions, such as those described above. The machine-readable medium may be any type of magnetic, optical, or electrical storage medium including a diskette, magnetic tape, CD-ROM, memory device, or other storage medium. In alternate embodiments, the present invention may be implemented in discrete hardware or firmware. By way of example, an application specific integrated circuit (ASIC) may be programmed to implement the functions of data reduction module 32 discussed above.

Additionally, according to one embodiment of the present invention, additional rate information of varying granularity over time is also maintained. In this embodiment, additional tables analogous to rate table 78 of FIG. 7 are used to maintain minimum, average, and maximum values for longer periods of time. According to one implementation, data for the four weeks preceding the current day are maintained in one-hour samples, data for the three months preceding that (i.e., data over for weeks old) is maintained in four-hour samples, and data preceding that (i.e., data over three months and four weeks old) is maintained in one-day samples. Thus, storage space is reduced by reducing the granularity of older data.

Thus, the present invention provides a method and apparatus for intelligent storage and reduction of network information. The present invention advantageously stores data in an intelligent manner which allows the amount of storage space required to be significantly reduced without losing any substantial amount of network information. Furthermore, the present invention stores data such that previous network configurations and/or network operating states can be re-created without requiring storage of substantial amounts of data.

In the discussions above, the present invention is described as being implemented using multiple tables. It is to be appreciated that such tables can be implemented in any of a wide variety of conventional manners, including arrays, linked lists, etc. Furthermore, it is also to be appreciated that alternate embodiments of the ,present invention can be implemented using different storage techniques other than tables, such as object oriented databases, etc.

Also in the discussions above, reference is made to specific types of tables and specific example tables are provided. It is to be appreciated, however, that the present invention is not limited to such specific tables and that the use of tables can vary with different embodiments of the present invention. By way of example, in alternate embodiments the granularity of data may be changed, certain tables may be expanded into multiple tables, multiple tables may be condensed into a single table, etc.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method comprising:
   receiving current network performance information;
   comparing the current network performance information with previously received network performance information;
   saving the current network performance information only if the current network performance information exceeds the previously received network performance information by a threshold amount; and
   updating an identifier associated with the current network performance information if the current network performance information does not exceed the previously received network performance information by the threshold amount.

2. The method of claim 1, wherein the saving of the current network performance information comprises saving the current network performance information to a log table.

3. The method of claim 1, further comprising:
   updating a timestamp associated with the previously received network performance information.

4. The method of claim 1, further comprising: periodically reducing the size of the saved network performance information.

5. The method of claim 4, wherein the periodically reducing of the size of the saved network performance information comprises collapsing multiple data elements into a single data element.

6. The method of claim 4, wherein the periodically reducing of the size of the saved network performance information comprises merging network performance information from multiple time periods into a single data entry.

7. The method of claim 6, wherein the number of time periods in the multiple time periods is dependent at least in part on a difference between the network performance information in each of the multiple time periods.

8. The method of claim 1, wherein the network performance information comprises network configuration information identifying a topology of the network.

9. An apparatus comprising:
   a storage device to store network performance information; and
   a data reduction module coupled to the storage device and to receive current network performance information, to compare the current network performance information with previously received network performance information, to save the current network performance information only if the current network performance information exceeds the previously received network performance information by a threshold amount, and to update an identifier associated with the current network performance information if the current network performance information does not exceed the previously received network performance information by the threshold amount.

10. The apparatus of claim 9, wherein the data reduction module is to save the current network performance information to a log table of the storage device.

11. The apparatus of claim 9, wherein the data reduction module is to update a timestamp associated with the previously received network performance information.

12. The apparatus of claim 9, wherein the data reduction module is to reduce periodically the size of the saved network performance information.

13. The apparatus of claim 12, wherein the data reduction module is to reduce the size of the saved network performance information by collapsing multiple data elements into a single data element.

14. The apparatus of claim 12, wherein the data reduction module is to reduce the size of the saved network performance information by merging network performance information from multiple time periods into a single data entry.

15. The apparatus of claim 14, wherein the number of time periods in the multiple time periods is dependent at least in part on a difference between the network performance information in each of the multiple time periods.

16. The apparatus of claim 9, wherein the network performance information comprises network configuration information identifying a topology of the network.

17. The apparatus of claim 9, wherein the storage device comprises a nonvolatile storage device.

18. A machine-readable medium having stored thereon a plurality of instructions, designed to be executed by a processor, to implement an operation comprising:

receive current network performance information;

compare the current network performance information with previously received network performance information;

save the current network performance information only if the current network performance information exceeds the previously received network performance information by a threshold amount; and update an identifier associated with the current network performance information if the current network performance information does not exceed the previously received network performance information by the threshold amount.

19. The machine-readable medium of claim 18, wherein the instructions to save the current network performance information comprise instructions to save the current network performance information to a log table.

20. The machine-readable medium of claim 18, wherein the operation further comprises update a timestamp associated with the previously received network performance information.

21. The machine-readable medium of claim 18, further including instructions to implement a function to periodically reduce the size of the saved network performance information.

22. The machine-readable medium of claim 21, wherein the instructions to reduce periodically the size of the saved network performance information comprise instructions to collapse multiple data elements into a single data element.

23. The machine-readable medium of claim 21, wherein the instructions to reduce periodically the size of the saved network performance information comprise instructions to merge network performance information from multiple time periods into a single data entry.

24. The machine-readable-medium of claim 23, wherein the number of time periods in the multiple time periods is dependent at least in part on a difference between the network performance information in each of the multiple time periods.

25. The machine-readable medium of claim 18, wherein the network performance information comprises network configuration information identifying a topology of the network.

* * * * *